US008385289B2

(12) United States Patent
Landais et al.

(10) Patent No.: US 8,385,289 B2
(45) Date of Patent: Feb. 26, 2013

(54) PROCEDURE PROCESSING METHOD FOR PACKET MODE LOCATING SERVICES IN A MOBILE RADIOCOMMUNICATION SYSTEM (75) Inventors: Bruno Landais, Pleumeur-Bodou (FR); Stanislas Bourdeaut, Paris (FR)

(73) Assignee: Alcatel Lucent, Paris (FR)

( * ) Notice: Subject to any disclaimer, the term of this patent is extended or adjusted under 35 U.S.C. 154(b) by 1093 days.

(21) Appl. No.: 10/493,535

(22) PCT Filed: Oct. 23, 2002

(86) PCT No.: PCT/FR02/03638
§ 371 (c)(1),
(2), (4) Date: Apr. 22, 2004

(87) PCT Pub. No.: WO03/037005
PCT Pub. Date: May 1, 2003

(65) Prior Publication Data
US 2005/0007980 A1    Jan. 13, 2005

(30) Foreign Application Priority Data

Oct. 23, 2001 (FR) .................................. 01 13697
Nov. 16, 2001 (FR) .................................. 01 14889

(51) Int. Cl.
    H04W 4/00        (2009.01)
(52) U.S. Cl. ....................................................... 370/331
(58) Field of Classification Search .................... 370/331
    See application file for complete search history.

(56) References Cited

U.S. PATENT DOCUMENTS 6,317,421 B1* 11/2001 Wilhelmsson et al. ....... 370/328
6,711,143 B1*  3/2004 Balazinski et al. ............ 370/329
6,898,425 B1*  5/2005 Wilhelmsson et al. ........ 455/423
6,904,034 B2*  6/2005 Kularatna et al. ............. 370/338
6,920,116 B1*  7/2005 Hossain et al. ................ 370/329
6,996,092 B1*  2/2006 Maguire et al. ............... 370/356
7,006,478 B1*  2/2006 Mizell et al. .................. 370/338
7,307,968 B2* 12/2007 Niemela et al. ............... 370/329
2001/0009544 A1*  7/2001 Vanttinen et al. ............. 370/338
2001/0033563 A1* 10/2001 Niemela et al. ............... 370/349
2003/0002455 A1*  1/2003 Kularatna et al. ............. 370/328
2006/0133315 A1*  6/2006 Eriksson et al. ............... 370/331

FOREIGN PATENT DOCUMENTS

GB    2 355 139 A    4/2001

OTHER PUBLICATIONS

3GPP TS 48.018 V4.3.1 (Jun. 2001), 3rd Generation Partnership Project; Technical specification Group GSM EDGE Radio Access Network; General Packet Radio Service; Base Station System—Serving GPRS Support Node; BSS GPRS Protocol, release 4, pp. 1-70.*
3GPP TSG GERAN WG2 #6, "Agenda item 7.2.5.9", ETSI, 2001, XP002204709—Oct. 22-26.
3GPP ETSI TS 143/059: "Functional stage 2 description of Location Services (LCS) in Geran" 3GPP ETSI, XP002204636—Feb. 2002.

* cited by examiner

Primary Examiner — Lester Kincaid
Assistant Examiner — Diego Herrera
(74) Attorney, Agent, or Firm — Sughrue Mion, PLLC (57) ABSTRACT

Systems and methods are provided for procedure processing for packet mode location services in a mobile radio communications cellular system, which may include entities of a base station subsystem (BSS) type, a network service entity (NSE), and a serving GPRS support mode (SGSN). In accordance with the systems and methods provided herein, in the event of an inter-NSE cell change, a current location procedure is not aborted if it can be maintained by the BSS.

26 Claims, 4 Drawing Sheets

FIG_1

FIG_2

FIG_3

FIG_4

FIG_5

FIG_7

FIG_6

PROCEDURE PROCESSING METHOD FOR PACKET MODE LOCATING SERVICES IN A MOBILE RADIOCOMMUNICATION SYSTEM

BACKGROUND OF THE INVENTION

The present invention relates in general to mobile radiocommunications systems.

More particularly, the present invention relates to location services that can be implemented in such systems in order to determine the geographical positions of the users of mobile stations.

For example, in the global system for mobile communications (GSM), such services are referred to as location services (LCS) and are defined in particular in specification 3GPP TS 43.059 published by the third generation partnership project (3GPP).

In general, in such systems, a distinction is drawn between circuit mode services and packet mode services. For example, in the GSM system, services in packet mode correspond to general packet radio service (GPRS) functionality. Circuit mode services and packet mode services lead to different circuit architectures and to different implementations for location services.

Figure 1:
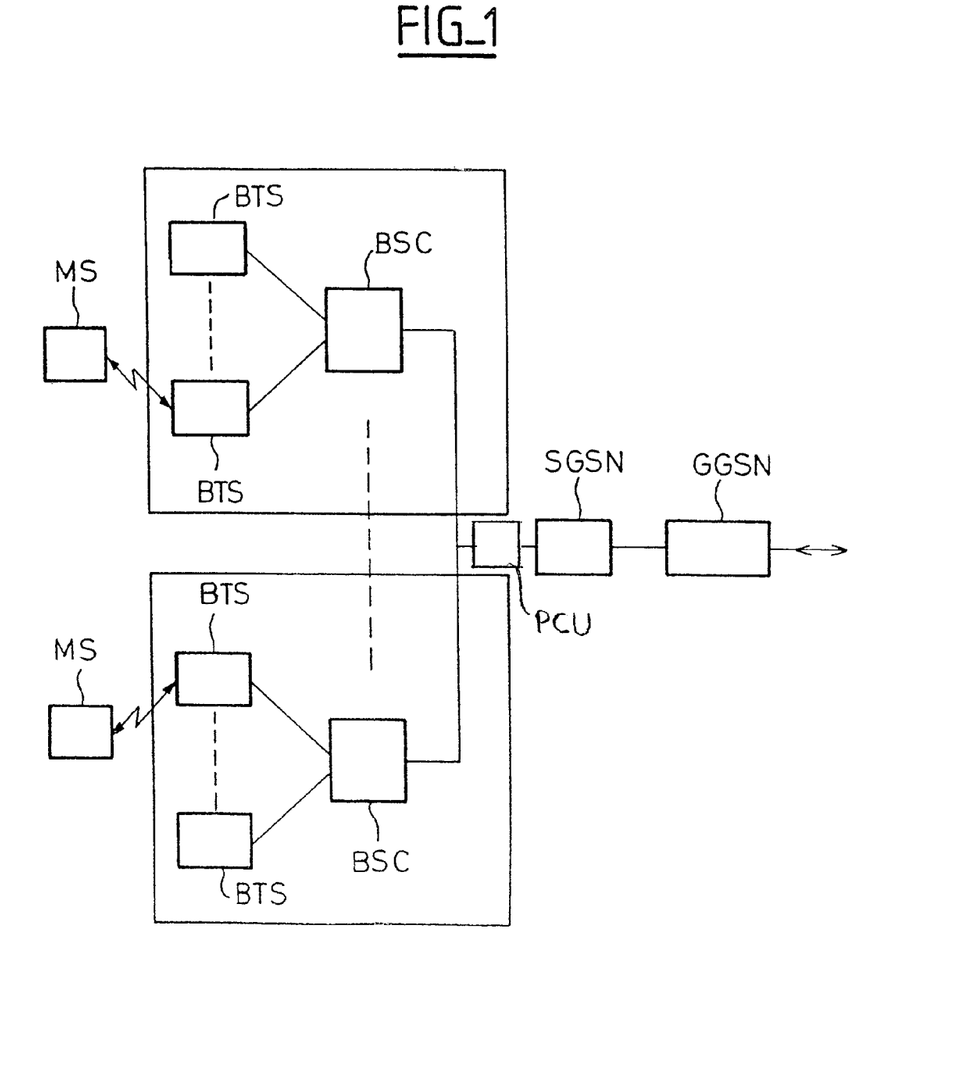
FIG. 1 (described above) serves to summarize the general architecture of a mobile radiocommunications cellular system of the GSM/GPRS type.

By way of example, the architecture of a GSM/GPRS system is summarized in FIG. 1. Various types of entity or equipment can be seen:
  a base station subsystem (BSS) including base transceiver stations (BTS) in communication with mobile stations (MS), and base station controllers (BSC); and
  a serving GPRS support node (SGSN) in communication with the BSS, and a gateway GPRS support node (GGSN) in communication with the SGSN and with external networks (not shown).

More generally, a distinction is drawn between a radio access network (RAN) and a core network (CN).

Furthermore, the functionalities of the BSS include functionalities that are common to circuit mode services and packet mode services, and functionalities that are specific to packet mode services. The functionalities specific to packet mode services correspond in particular to an entity of the packet control unit (PCU) type. For a description of the functions of a PCU, reference can be made in particular to specifications 3GPP TS 23.060. As shown in FIG. 1, PCU type equipments can be located in particular between BSC type equipments and SGSN type equipments, in which case equipment of the PCU type can control a plurality of equipments of the BSC type, as shown in FIG. 1.

In the layer architecture used to describe such systems, distinctions are drawn at the "Um" interface between MS and BSS as follows in order of increasing level:
  a radio frequency (RF) GSM layer;
  a medium access control (MAC) layer; and
  a radio link control (RLC) layer.

Similarly, at the "Gb" interface between the BSS and the SGSN, the following can be distinguished:
  an L1bis layer;
  a network service layer; and
  a BSS GPRS protocol (BSSGP) layer.

Between MS and SGSN, a higher layer or logical link control (LLC) layer enables LLC frames to be exchanged that are made from data units of higher level. In LLC frames, these data units are referred to as LLC protocol data units (LLC-PDU).

The LLC-PDU data units are then segmented in the MAC/RLC layer so as to form blocks referred to as RLC data blocks. Thereafter the RLC data blocks are put into the format required for transmission over the "Um" interface in the physical layer.

The "network service" layer is defined in particular in specification 3GPP TS 48.016. It is recalled that the functions implemented by the network service layer include in particular managing the identifiers of virtual connections used for communication over the "Gb" interface in the BSS GPRS protocol (BSSGP) as defined in particular in specification 3GPP TS 48.018. It is also recalled that a virtual connection is identified by means of a network service entity (NSE) identifier (NSEI) and by means of a BSSGP virtual connection identifier (BVCI).

In addition, higher level signaling protocols are also provided, in particular for GPRS radio resource management (GRR), GPRS mobility management (GMM), session management (SM), etc. . . . .

In particular, in the radio resource management protocol, various modes are possible in packet mode for a mobile station:
  a "packet transfer" mode in which resources are allocated temporarily when data actually needs to be transmitted during a call, these resources forming a temporary virtual channel known as a temporary block flow (TBF) channel enabling data to be transferred between the mobile station and the network in a given transmission direction; and
  a "packet idle" mode in which no TBF is set up.

In contrast, in circuit mode, the mode in which resources are allocated to a mobile station is known as a "dedicated" mode, these resources then being dedicated resources that are allocated to the mobile station for the duration of the call.

In particular, in the mobility management protocol, various procedures are provided whereby, during a GPRS session in a "ready" state, a mobile station MS informs the SGSN of any change of cell by means of a cell update message, whereas in a "standby" state, a mobile station MS informs the SGSN of any change of routing area (RA) by means of a routing area update message (where a routing area corresponds to a set of cells). Similarly, in an "idle" state, outside a GPRS session, the location of the mobile station MS is updated if the mobile station changes routing area. These procedures relating to the mobility management protocol thus enable mobile stations to be located to some extent (i.e. sufficiently for the operating needs of the system), but with accuracy that is well below that provided by location services, since at best they can do no more than indicate the cell in which the mobile station is located.

For packet mode services, location services are implemented as follows, this description being given with reference to FIGS. 2 to 5 which are taken from above-cited specification 3GPP TS 43.059.

Location service support entities are provided, such as, in particular in the access network, a serving mobile location center (SMLC) entity whose function, on receiving a transmission request from a call network entity is to coordinate the various actions required for delivering said location services, such as: requesting the radio measurements needed for locating the mobile station MS, transmitting the results of these measurements to a suitable calculation function, receiving the result from said calculation function, and forwarding the result in response to the received request.

Figure 2:
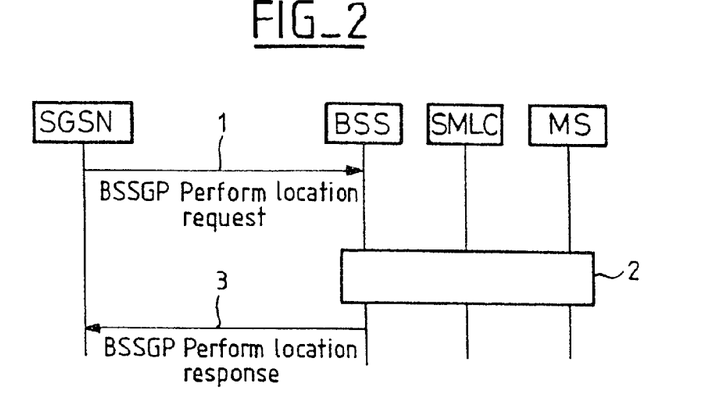
FIGS. 2, 3, 4, and 5 (described above) serve to summarize the implementation of a location services (LCS) type procedure in a GSM/GPRS type system in packet mode.

As summarized in FIG. 2, for a mobile station MS that is to be located (a target mobile station):
  in a step 1, the SGSN sends a request to the BSS to locate the mobile station MS in a "BSSGP perform location request" message;

in a step 2, a location procedure is implemented, this procedure involving an exchange of signaling between the BSS, SMCL, and MS entities; and in a step 3, the BSS sends to the SGSN its response to the current location request in a "BSSGP perform location response" message.

Figure 3:
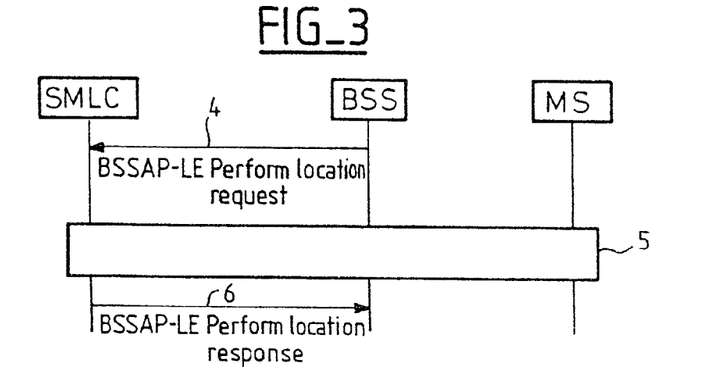

FIG. 3 summarizes the location procedure step:

in a step 4, the BSS sends a request to the SMLC in a "BSSAP-LE perform location request" message;

in a step 5, the SMLC coordinates the various actions required, including in particular sending the necessary signaling messages; and in a step 6, the SMLC sends its response to the BSS in a "BSSAP-LE perform location response" message.

Figure 4:
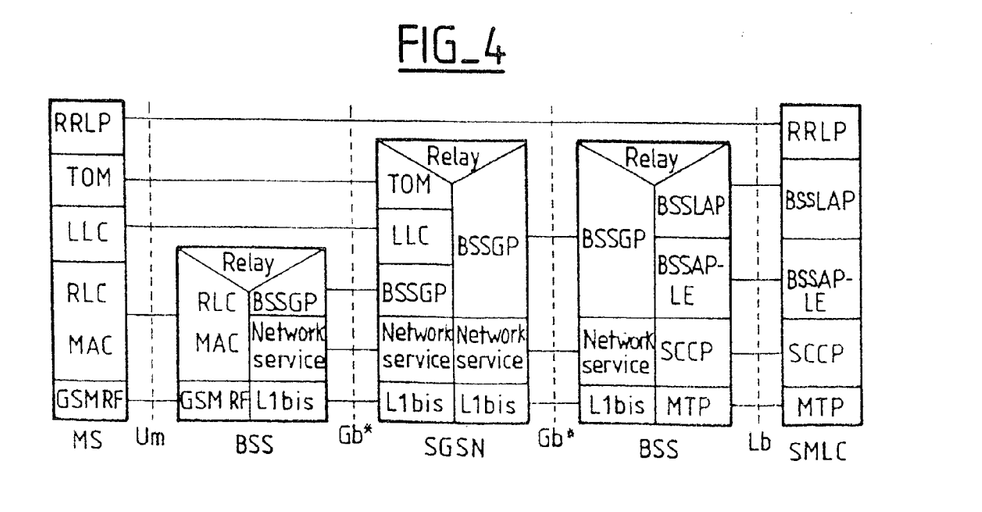

FIG. 4 summarizes the protocol layers used for supporting the corresponding signaling between the MS and the SMLC. There can be seen in this figure, in order:

in the mobile station MS:
an RF GSM layer;
a medium access control (MAC) layer;
a radio link control (RLC) layer;
a logical link control (LLC) layer;
a tunnelization of messages (TOM) layer; and
a radio resource LCS protocol (RRLP) layer;

in the BSS, at the "Um" interface with the mobile station MS:
an RF GSM layer;
a medium access control (MAC) layer; and
a radio link control (RLC) layer;

in the BSS, at the "Gb" interface with the SGSN:
an L1bis layer;
a network service layer; and
a BSS GPRS protocol (BSSGP) layer;

in the SGSN at the "Gb" interface with the BSS:
an L1bis layer;
a network service layer;
a BSS GPRS protocol (BSSGP) layer;
a logical link control (LLC) layer; and
a tunnelization of messages (TOM) layer;

in the BSS, at the "Gb" interface with the SGSN:
an L1bis layer;
a network service layer; and
a BSS GPRS protocol (BSSGP) layer;

in the BSS at the "Lb" interface with the SMLC:
a message transfer part (MP) layer;
a signaling connection control part SCCP) layer;
a base station system application part—LCS extension (BSSAP-LE) layer; and
a base station system application part (BSSLAP) layer; and in the SMLC at the "Lb" interface with the BSS:
a message transfer part (MTP) layer;
a signaling connection control part (SCCP) layer;
a base station system application part—LCS extension (BSSAP-LE) layer;
a base station system application part (BSSLAP) layer; and
a radio resource LCS protocol (RRLP) layer.

Over the "Gb" and "Um" interfaces, the corresponding signaling uses the signaling resources of the GSM/GPRS system. Over the "Lb" interface between the SMLC and the BSS, the corresponding signaling uses specific resources provided specifically for these location services.

Figure 5:
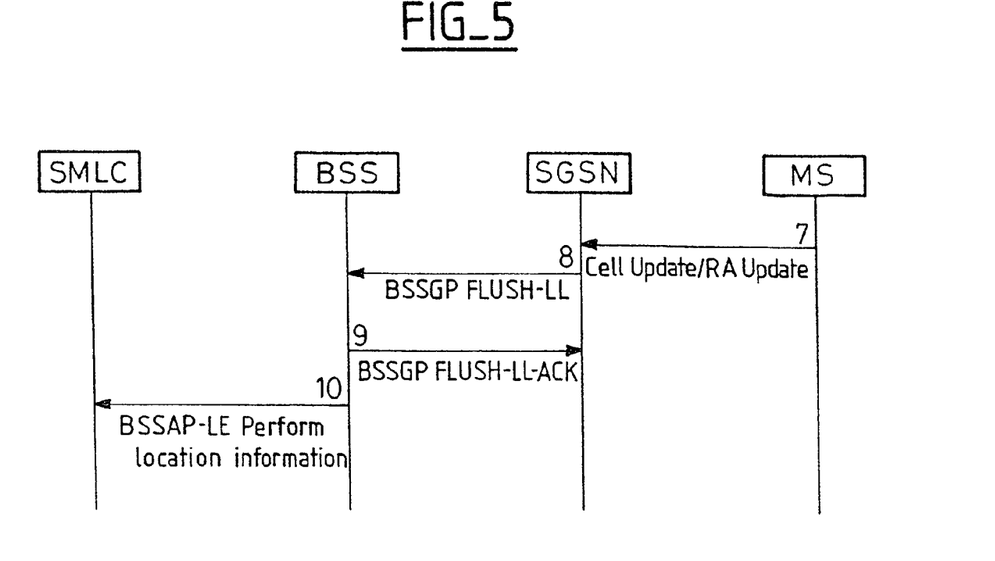

A procedure is also provided to keep an SMLC informed of the cell changes of a mobile station while executing a location procedure. Such a procedure is summarized in FIG. 5:

in a step 7, the mobile station MS detects a change of cell, and as appropriate it sends a cell update message or a routing area update message to the SGSN;

in a step 8, the SGSN sends the BSS a data unit or message known as a "BSSGP FLUSH-LL", where such a message is defined in specification 3GPP TS 48.018; this enables LLC PDU data units to be rerouted in the down direction (i.e. from the network to mobile stations) from an old cell (prior to cell change) identified by information BVCI(old) to a new cell (after change of cell) identified by an information BVCI(new), where BVCI stands for "BSSGP virtual connection identifier";

in a step 9, the BSS sends the SGSN an acknowledgment of receipt in the form of a data unit or message known as "BSSGP FLUSH-LL-ACK" (likewise defined in specification 3GPP TS 48.018); and in a step 10, the BSS sends the SMLC a "BSSAP-LE perform location information" message, which message contains the identity of the new cell.

It will nevertheless be understood that a location procedure cannot be pursued under all circumstances, and that sometimes execution of such a procedure needs to be aborted by the SGSN.

A problem is thus to enable the SGSN to determine when execution of a current location procedure needs to be aborted, in the event of a change of cell.

One solution to this problem is proposed in the document: 3GPP TSG GERAN WG2 #6bis, Aix-en-Provence, France, October 22-26, GS-010232, agenda item 7.2.5.9. That solution consists merely in considering that if a change of cell is an inter-NSE change, then the SGSN aborts the current location procedure.

As has been observed by the Applicant, such a solution suffers in particular from the drawback that depending on the manner in which cells are distributed in different NSEs, that can lead to a situation in which such a procedure can be aborted following any change of cell. For example, this can compromise any architecture based on distributed NSEs, in which a relatively large number of NSEs are present per BSS (e.g. because the NSEs are relatively smaller).

A current location procedure needs to be aborted by the SGSN, in particular in the event of a change of cell corresponding to a change of BSS (under such circumstances, the SMLC in charge of the location procedure need not be the same). However, merely knowing the identity of the new cell does not enable the SGSN to determine whether or not the location procedure needs to be aborted. In order to determine whether the procedure should be aborted, it would be necessary for the SGSN to know how the cells are shared amongst different BSSes. Unfortunately, the SGSN cannot see the BSS through the "Gb" interface, since it deals with said interface only via network service entities (NSEs). In addition, the way in which cells are shared amongst different BSSes does not necessarily correspond to the way in which cells are shared amongst different NSEs. In particular, such sharing can be implemented on the basis of operating and maintenance criteria that need not be the same from the access network point of view (for the BSS) and for the core network point of view (for the NSE). There can thus be one or several NSEs per BSS.

Thus, the Applicant has found that the prior solution outlined above can lead to a situation in which such a procedure can be aborted as the result of any change of cell whereas, the real need is to abort execution only when changing BSS.

A particular object of the present invention is to avoid all or some of the above-mentioned drawbacks.

SUMMARY OF THE INVENTION

In one aspect, the present invention provides a procedure processing method for packet mode location services in a mobile radiocommunications cellular system, said system including entities of the base station subsystem (BSS) type, a network service entity (NSE), and a serving GPRS support mode (SGSN), in which method, in the event of an inter-NSE cell change, a current location procedure is not aborted if it can be maintained by the BSS.

According to another characteristic, in the event of an inter-NSE cell change, information relating to said cell change is transmitted by the SGSN to the BSS so as to enable the BSS to maintain execution of said procedure, if possible.

According to another characteristic, said information relating to an inter-NSE cell change includes the following information:

"BVCI(new)" identifying the new cell after the cell change, where "BVCI" stands for "BSSGP virtual connection identifier"; and "NSEI(new)" identifying the new NSE after the cell change, where "NSEI" stands for "network service entity identifier".

According to another characteristic, said information relating to an inter-NSE cell change is transmitted in a "BSSGP-FLUSH-LL" type message.

According to another characteristic, the BSS makes use of the SGSN sending the BSS said information relating to an inter-NSE cell change to reroute a location context so as to enable said procedure to be continued after said change of cell.

According to another characteristic, said change of cell corresponds to an inter-NSE, intra-BSS cell change.

According to another characteristic, said change of cell corresponds to an inter-NSE, inter-BSS cell change.

According to another characteristic, said location context is rerouted internally within the BSS.

According to another characteristic, said location context is rerouted in centralized manner at the SGSN.

According to another characteristic, a location context information transfer is performed from an NSE prior to cell change to an NSE after cell change.

According to another characteristic, said location context information transfer is performed between NSEs that are united physically within a common piece of equipment.

According to another characteristic, an NSE type entity corresponds to a packet control unit (PCU) type entity.

The present invention also provides mobile radiocommunications network equipment and a mobile radiocommunications system including means adapted to implement a method of the present invention.

Other objects and characteristics of the present invention appear on reading the following description of embodiments, given with reference to the accompanying figures, in which:

DESCRIPTION OF EMBODIMENTS

By way of example, the description below relates to a location services (LCS) type procedure in a GSM/GPRS type system in packet mode. Nevertheless, it will be understood that the invention is not limited to such an example.

In one of the aspects of the invention, an example of the method of the invention is as follows:

if an inter-NSE cell change occurs for a target mobile station MS during a location procedure:

when the current LCS procedure can be maintained by the BSS during the change of cell (in particular while re-selecting a cell), i.e. in this example when performing an intra-BSS and inter-NSE cell change, then the SGSN does not abort the location procedure;

when the current LCS procedure cannot be maintained by the BSS during the change of cell (in particular while re-selecting a cell), i.e. in this example for a cell change that is both inter-BSS and inter-NSE, then the SGSN aborts the location procedure; and if an intra-NSE cell change occurs during the location procedure, the SGSN does not abort the procedure.

In another feature of the invention, the BSS informs the SGSN whether it can maintain a current location procedure during a change of cell. In particular, as mentioned above, this enables the SGSN to determine whether or not to abort the current location procedure.

Advantageously, the BSS informs the SGSN whether it can maintain said procedure during a change of cell in a message of the "BSSGP FLUSH-LL-ACK" type.

Figure 7:
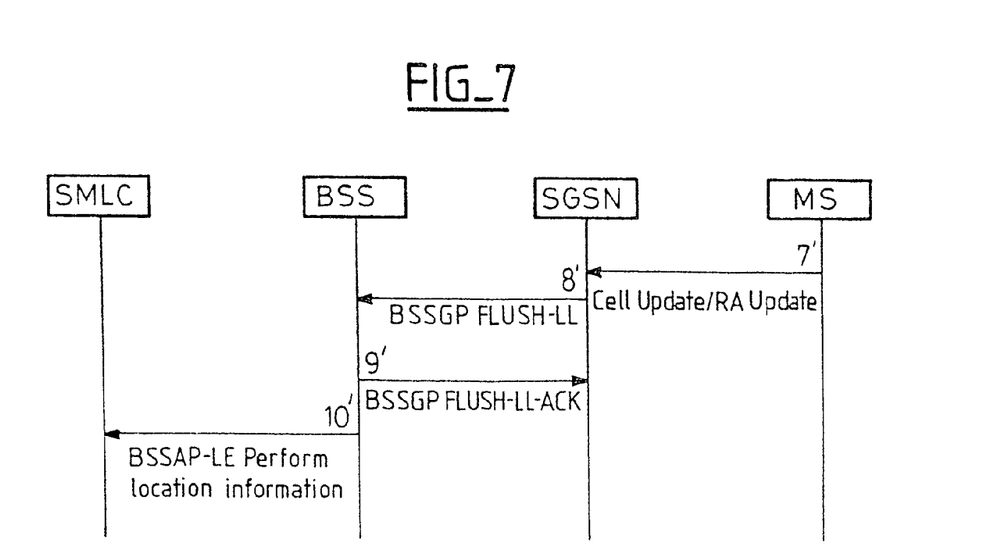
FIG. 7 serves to show an example of the method of the invention.

For example, in the example shown in FIG. 7, steps 7', 8', and 10' can be similar to steps 7, 8, and 10 of FIG. 5, while in step 9', the "BSSGP FLUSH-LL-ACK" message transmitted by the BSS to the SGSN can be used to provide the information as to whether or not the BSS can maintain the location procedure during the change of cell.

The "BSSGP FLUSH-LL-ACK" message then contains:

an indication as to whether to not the current location procedure is to be maintained or canceled.

In the event of the location procedure being maintained, the following information may also be included in the message (assuming the information was present in the "BSSGP-FLUSH-LL" message received in step 8'):

"BCVI(new)" identifying the new cell after the change of cell, where "BVCI" stands for "BSSGP virtual connection identifier";

"NSEI(new)" identifying the new NSE after a change of cell, where "NSEI" stands for "network service entity identifier".

For further details concerning BCVI, NSEI, BCVI(new), and NSEI(new), reference can be made in particular to specification 3GPP TS 48.018.

Advantageously:

the item "BCVI(new)" is included in the "BSSGP FLUSH-LL-ACK" message only if the current location procedure is maintained; and the item "NSEI(new)" is included in the "FLUSH-LL-ACK" message only if the item "BVI(new)" is included and if the item "NSEI(new)" has been received in the "BSSGP FLUSH-LL" message.

According to another feature of the invention, the SGSN provides the BSS with information relating to an inter-NSE cell change so as to allow the BSS, where possible, to maintain a current location procedure.

In particular, said information relating to a change of cell comprises the following information transmitted by the SGSN to the BSS in a FLUSH-LL type message:

"BVCI(new)" identifying the new cell after the change of cell, where "BVCI" stands for "BSSGP virtual connection identifier"; and "NSEI(new)" identifying the new NSE after the change of cell, where "NSEI" stands for "network service entity identifier".

According to another feature of the invention, the invention also proposes making use of the "BSSGP FLUSH-LL" message sent by the SGSN to BSS during step 8' not only for rerouting down LLC-PDU data units following a change of cell (as is presently the case according to specification 3GPP TS 48.018) but also for rerouting a location context (i.e. a data set relating to a mobile station for a current location procedure), thereby enabling the location procedure to be continued after the change of cell.

In this example, the rerouting is internal to the BSS: the location context is not sent by the SGSN from one NSE to another, but it is the BSS which itself "shifts" the context internally.

In another example, with centralized management at SGSN level, if such contexts are managed by the SGSN, then the SGSN can cause location context to be transferred by making use of a "BSSGP FLUSH-LL" type message or the equivalent.

According to another feature of the invention, the invention provides for not aborting a current location procedure in the event of an inter-NSE, inter-BSS cell change, if it is possible to maintain the procedure.

In other words, it is not necessary for the cell change to be an inter-NSE, intra-BSS cell change for it to be possible to continue with the location procedure, providing it is possible to maintain the procedure, thereby enabling the method to be further optimized.

In an implementation, said procedure can be maintained if a functional entity of said system, corresponding to the NSE prior to cell change, and receiving information relating to the cell change, is capable of rerouting the location context (or transferring information or signaling relating to the current location procedure) to a functional unit of the system, corresponding to the NSE after the change of cell.

In particular, said transfer is possible between functional entities that are physically united in the same piece of equipment.

Figure 6:
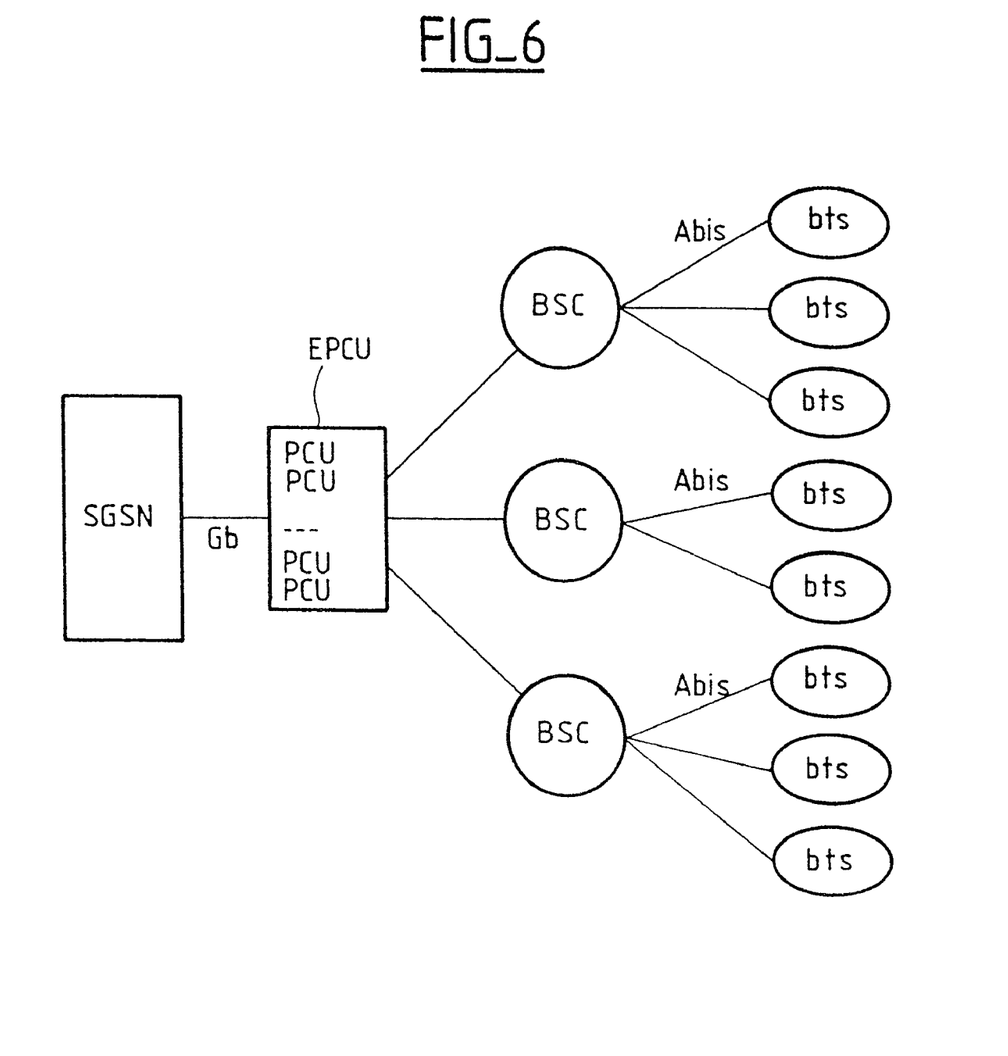
FIG. 6 shows an example of a network configuration to which an implementation of the present invention is applicable.

In the example shown in FIG. 6, said functional entities are packet control units (PCUs) physically united in the same piece of equipment, e.g. referenced EPCU. In the network configuration shown in FIG. 6 by way of example, the network thus includes a piece of equipment referenced EPCU that contains a set of PCUs, with the piece of equipment referenced EPCU being connected firstly to an SGSN via a "Gb" interface, and secondly to a set of BSCs and BTSes.

In particular, the various PCUs are seen by the SGSN as being network service entities (NSEs), and the resources available in these various PCUs can be allocated dynamically as a function of requirements to the various cells defined in the set of BSSes under consideration.

As a function of these requirements and depending on the kinds of cell change that can be performed by a mobile station, a cell change may be:
- intra-NSE;
- inter-NSE, intra-BSS; or
- inter-NSE, inter-BSS.

In an intra-BSS change, a current location procedure can be maintained since the BSS receives the information relating to the cell change as needed for continuing the procedure (as described in above-summarized FIG. 5). This therefore applies not only to an inter-NSE, intra-BSS change, but also to an intra-NSE change since that necessarily corresponds to an intra-NSE, intra-BSS change.

For an inter-NSE, inter-BSS change, the invention suggests not aborting a current location procedure if it is possible to maintain the procedure.

Specifically, in the example shown in FIG. 6, said procedure can be maintained if the PCU entity prior to change of cell and receiving the information relating to the change of cell is capable of transferring the signaling relating to the current procedure to the PCU entity after the change of cell.

The invention also provides for making use of a "BSSGP FLUSH-LL" type message sent by the SGSN to the BSS during step 8 of FIG. 5 not only to reroute down LLC-PDU data units following a change of cell (as presently occurs according to the specification 3GPP TS 48.018), but also to reroute a location context (i.e. a data set needed to enable a current location procedure to be executed for the mobile station), so as to make it possible for the location procedure to be continued after the change of cell.

The "BSSGP-FLUSH-LL" message contains the following information in particular:

"BVCI(new)" identifying the new cell after the change of cell where "BVCI" stands for "BSSGP virtual connection identifier"; and "NSEI(new)" identifying the new NSE after the change of cell, where "NSEI" stands for "network service entity identifier".

In other words, if an inter-NSE cell change occurs for a mobile station during a location procedure, the SGSN supplies the information NSEI(new) and BVCI(new) in the FLUSH-LL PDU message sent to the BSS so as to enable to maintain the current location procedure, if possible.

In still other terms, if the old NSE supports LCS procedures in GPRS, then the items NSEI(new) and BVCI(new) are included in the FLUSH-LL PDU message in the event of an inter-NSE cell change.

On the basis of this information, equipment such as the equipment EPCU shown in FIG. 6 can ensure that a current location procedure is maintained by transferring internally the signaling that has been exchanged in this procedure.

Specifically, the PCU entity associated with NSEI(old) and receiving such information can identify the entity NSEI(new) and thus act internally to transfer the signaling.

In an example, the BSS informs the SGSN whether the current location procedure is or is not being transferred to the new NSE in the event of an inter-NSE cell change. The serving GPRS support node (SGSN) then aborts or does not abort the procedure depending on whether it receives information indicating that the current location procedure has or has not been transferred to the new NSE.

Advantageously, the BSS informs the SGSN whether it can maintain said procedure during a cell change in a message of the "BSSGP FLUSH-LL-ACK" type.

For example, in the example shown in FIG. 7, the steps 7', 8', and 10' may be similar to the steps 7, 8, and 10 of FIG. 5, while in step 9', the "BSSGP FLUSH-LL-ACK" message transmitted by the BSS to the SGSN can be used in an inter-NSE cell change to indicate whether the current LCS procedure has or has not been transferred to the new NSE.

In which case, the "BSSGP FLUSH-LL-ACK" message contains:
information as to whether the current location procedure is or is not being transferred to the new NSE during an inter-NSE cell change.

When the location procedure is transferred, the following information may also be included in the message:
"BVCI(new)" identifying the new cell after the cell change, where "BVCI" stands for "BSSGP virtual connection identifier"; and
"NSEI(new)" identifying the new NSE after the change of cell, where "NSEI" stands for "network service entity identifier".

For further details on "BVCI", "NSEI", "BVCI(new)", and "NSEI(new)", reference can be made in particular to the specification 3GPP TS 48.018.

Advantageously:
the information "BCVI(new)" is included in the "BSSGP FLUSH-LL-ACK" message only if the current location procedure is being transferred to the new NSE.

According to anther feature of the invention, since said location procedure includes signaling exchanges between a serving BSS, a mobile station (MS) to be located, and a serving mobile location (SMLC) (as summarized with reference to FIG. 3), said procedure is not aborted if the procedure can be maintained by said SMLC.

This implementation is also most advantageous when the mobile station to be located passes from a serving cell to a target cell which are both connected to the same SMLC but not to the same EPCU.

In particular, the SMLC can maintain the procedure if it possesses sufficient information relating to the cell change to enable said exchanges of signaling to continue to be implemented.

One possible implementation is then as follows:
the serving SGSN informs a server equipment such as the equipment EPCU of FIG. 6 of the change of NSE, together with the old and new NSEIs;
the serving EPCU relays this information to the SMLC which detects that it is connected both to the target cell and to the serving cell, and therefore that it can maintain the procedure;
after the change of cell, the SGSN requests the SMLC to provide a location for the mobile station as specified by its international mobile subscriber identity (IMSI) number;
the SMLC recognizes the IMSI number of the mobile station and remembers that a procedure is current and has been maintained for this mobile station; and
the SMLC then responds to the location request.

Other implementations of the present invention, other than those described above, are naturally possible.

The present invention also provides a mobile radiocommunications network equipment or entity (such as in particular an SGSN, a BSS, a PCU, or indeed an EPCU as mentioned for example in FIG. 6, or indeed an SMCL), and it also provides a mobile radiocommunications system, including means adapted to implement a method of the present invention in accordance with any one of the above-described implementations.

The particular implementation of such means does not present any particular difficulty for the person skilled in the art, so such means need not be described herein in greater detail than the functional description given above.

The invention claimed is:

1. A procedure processing method for packet mode location services in a mobile radio communications cellular system, said system including entities of a base station subsystem (BSS) type, a network service entity (NSE) type, and a serving GPRS support node (SGSN) type, the method comprising:
performing a location procedure for identifying a geographical location of a mobile station (MS),
determining, in the event of an inter-NSE cell change from a first NSE to a new NSE occurring during the location procedure that is currently being performed, whether the current location procedure can be maintained by the BSS following change from the first NSE to the new NSE, wherein the current location procedure is not aborted when it is determined that the current location procedure can be maintained, and
maintaining the current location procedure to identify the geographical location of the MS, wherein the current location procedure continues without being aborted after the inter-NSE cell change.

2. A method according to claim 1, wherein, in the event of the inter-NSE cell change, the method further comprises:
transmitting, by the SGSN, information relating to said inter-NSE cell change, to the BSS so as to enable the BSS to maintain execution of said current location procedure.

3. A method according to claim 2, wherein said information relating to the inter-NSE cell change transmitted by the SGSN includes the following information:
"BVCI(new)" identifying a new cell after the inter-NSE cell change, where "BVCI" stands for "BSSGP virtual connection identifier"; and
"NSEI(new)" identifying the new NSE after the inter-NSE cell change, where "NSEI" stands for "network service entity identifier".

4. A method according to claim 2, wherein said information relating to the inter-NSE cell change transmitted by the SGSN is transmitted in a "BSSGP-FLUSH-LL" type message.

5. A method according to claim 3, further comprising:
using, by the BSS, said information relating to the inter-NSE cell change, sent by the SGSN, to reroute a location context so as to enable said current location procedure to be continued after said inter-NSE cell change.

6. A method according to claim 1, wherein said inter-NSE cell change that occurs during the location procedure corresponds to an inter-NSE, intra-BSS cell change.

7. A method according to claim 5, wherein said inter-NSE cell change that occurs during the location procedure corresponds to an inter-NSE, inter-BSS cell change.

8. A method according to claim 5, wherein said location context is rerouted internally within the BSS.

9. A method according to claim 5, wherein said location context is rerouted in a centralized manner at the SGSN.

10. A method according to claim 5, further comprising performing a location context information transfer from the first NSE to the new NSE.

11. A method according to claim 10, wherein the location context information transfer is performed between the first NSE and the new NSE that are united physically within a common piece of equipment.

12. A method according to claim 10, wherein the first NSE and the new NSE are packet control units (PCUs).

13. Mobile radio communications network equipment adapted to implement a method according to claim 1.

14. A mobile radio communications system adapted to implement a method according to claim 1.

15. A serving GPRS support node (SGSN) comprising:
a processor configured to perform operations of:
determining whether a cell change occurs; and
in the event of an inter-NSE cell change occurring, transmitting information relating to said cell change to a base station subsystem (BSS), so as to enable the BSS to maintain a current location procedure, if possible,
said information including the following information:
"BVCI(new)" identifying the new cell after the cell change, where "BVCI" stands for "BSSGP virtual connection identifier"; and
"NSEI(new)" identifying the new NSE after the cell change, where "NSEI" stands for "network service entity identifier",
said information being transmitted in a BSSGP-FLUSH-LL message.

16. A base station subsystem (BSS) comprising:
a processor configured to perform operations of:
in the event of an inter-NSE cell change occurring, receiving information relating to the cell change from a serving GPRS support node (SGSN), and
maintaining a current location procedure, if possible, based on said received information,
said information including the following information:
"BVCI(new)" identifying the new cell after the cell change, where "BVCI" stands for "BSSGP virtual connection identifier"; and
"NSEI(new)" identifying the new NSE after the cell change, where "NSEI" stands for "network service entity identifier",
said information being transmitted in a BSSGP-FLUSH-LL message.

17. A method according to claim 1, wherein the determining whether the current location procedure can be maintained by the BSS comprises:
determining if the inter-NSE cell change involves changing to the new NSE associated with the same BSS,
issuing an instruction to abort the current location procedure if the inter-NSE cell change is determined to involve changing to the new NSE associated with a different BSS, and
maintaining the current location procedure if the inter-NSE cell change is determined to involve changing to the new NSE associated with the same BSS.

18. A procedure processing method for packet mode location services in a mobile radio communications cellular system, said method comprising:
determining whether a cell change occurs from a first network service entity (NSE) to a new NSE; and
in the event of an inter-network service entity (NSE) cell change occurring, transmitting, a serving GPRS support node (SGSN) to a base station subsystem (BSS), in a BSSGP-FLUSH-LL message, information relating to said inter-NSE cell change, so as to enable the BSS to maintain a current location procedure, if possible, said information including the following information:
"BVCI(new)" identifying a new cell after the inter-NSE cell change, where "BVCI" stands for "BSSGP virtual connection identifier"; and
"NSEI(new)" identifying the new NSE after the inter-NSE cell change, where "NSEI" stands for "network service entity identifier".

19. A method according to claim 18, in which the BSS makes use of said information relating to the inter-NSE cell change to reroute a location context so as to enable said location procedure to be continued after said inter-NSE cell change.

20. A method according to claim 18, in which said inter-NSE cell change corresponds to an inter-NSE, intra-BSS cell change.

21. A method according to claim 18, in which said inter-NSE cell change corresponds to an inter-NSE, inter-BSS cell change.

22. A method according to claim 18, in which said location context is rerouted internally within the BSS.

23. A method according to claim 18, in which said location context is rerouted in centralized manner at the SGSN.

24. A method according to claim 18, in which a location context information transfer is performed from the first NSE to the new NSE.

25. A method according to claim 24, in which said location context information transfer is performed between the first NSE and the new NSE that are united physically within a common piece of equipment.

26. A method according to claim 24, in which an NSE type entity corresponds to a packet control unit (PCU) type entity.

* * * * *